United States Patent [19]

Thaddey

[11] 3,723,969

[45] Mar. 27, 1973

[54] METHOD OF AND APPARATUS FOR READING CHARACTERS FORMED BY A PLURALITY OF AREAS

[75] Inventor: Kurt Thaddey, Buchs/Zurich, Switzerland

[73] Assignee: Ciba-Geigy AG, Basel, Switzerland

[22] Filed: July 30, 1970

[21] Appl. No.: 59,650

[30] Foreign Application Priority Data

Aug. 7, 1969 Switzerland ........................12100/69

[52] U.S. Cl. ....................340/146.3 Z, 235/61.11 E, 250/219 DC, 219 CR

[51] Int. Cl. ..............................................G06k 9/18

[58] Field of Search ............179/90 C; 235/61.11 E, 235/61.11 R, 61.12; 250/219 ID, 219 CR; 340/146.3

[56] References Cited

UNITED STATES PATENTS

| | | | |
|---|---|---|---|
| 3,033,449 | 5/1962 | Quinn et al. | 235/61.11 |
| 2,944,735 | 7/1960 | Goldstern | 235/61.12 |
| 2,769,922 | 11/1956 | Peery | 340/146.3 X |
| 2,906,819 | 9/1959 | Smith | 340/146.3 |
| 2,939,016 | 5/1960 | Cannon | 250/219 ID |
| 3,375,348 | 3/1968 | Goldstern | 235/61.11 E |

*Primary Examiner*—Maynard R. Wilbur
*Assistant Examiner*—Leo H. Boudreau
*Attorney*—Pierce, Scheffler & Parker

[57] ABSTRACT

The invention provides a method of and apparatus for reading characters formed by a plurality of areas, or perforations of equal size arranged at intersections of the rows and columns of a notional matrix. The number and arrangement of the areas to form a character is chosen so that only three rows forming a character need be scanned, each row having one, two or four areas to uniquely identify that character. Each character is scanned by a photosensitive device which produces, for each row scanned, a signal whose magnitude is proportional to the total number of areas in a row. The signal is coded in a four position binary code to provide a binary representation of the scanned character. The first and third positions of the code are assigned to the values derived from scanning the first and third of the three rows and the second and fourth code positions assigned to the value of the signal produced on scanning the second of the three rows. If the maximum number of areas in a row occurs in the second row, the fourth position assumes a binary value '1' while the second position assumes a binary value'0.'

5 Claims, 5 Drawing Figures

Figure 1:
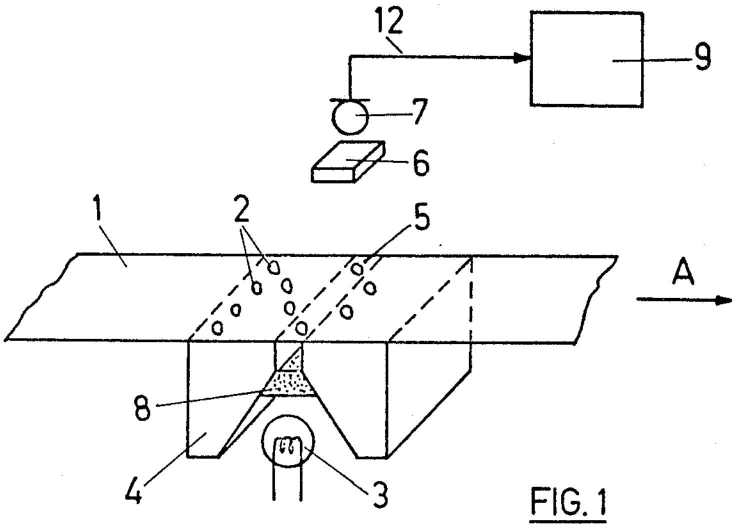

Inventor
Kurt Thaddey

By Pierce, Scheffler & Parker
Attorneys

Inventor
Kurt Thaddey
By Pierce, Scheffler & Parker
Attorneys

Inventor

Kurt Thaddey

By Pierce, Scheffler & Parker

Attorneys

Patented March 27, 1973 | 3,723,969

4 Sheets-Sheet 4

Inventor
Kurt Thaddey

By Pierce, Scheffler & Parker
Attorneys

METHOD OF AND APPARATUS FOR READING CHARACTERS FORMED BY A PLURALITY OF AREAS

This invention relates to a method of and apparatus for reading characters which are formed by a plurality of dots arranged in predetermined patterns which are derived from a notional matrix or grid of intersecting row and column lines, each dot of a character being positioned at an intersection of a row and column line.

In one known method of reading such characters, one line is selected as a reference line which is scanned to provide signals representing the number of dots in that line. The signals are then coded in a two-out-of-five binary code to provide a coded representation of the character scanned. A disadvantage of this method is that a separate signal must be produced for each dot in the reference line, which in the case of the dots being scanned sequentially by a single photocell, requires rather expensive electronic equipment to code the train of sequential pulses. Alternatively a plurality of photocells are required when all the dots in the reference line are scanned simultaneously.

In another known method a plurality of photocells are used, each being positioned at the intersection of a row and column line of a notional matrix whose dimensions correspond with those of the matrix from which the pattern of dots making up the characters to be scanned are formed. This requires accurate registration between the scanning device comprising the matrix of photocells and the characters to be scanned.

According to the present invention we provide a method of reading characters formed by a plurality of areas of equal size, each area being positioned at an intersection of the rows and columns of a notional matrix, the number of rows in the matrix and the arrangement of said areas to form a character being chosen so that the number of areas in each of at least three rows of the matrix identify a character, the method comprising scanning said three rows of a character to produce, for each row, a signal representing the total number of areas in a row, deriving from the signals obtained by scanning further signals representing bits in a four position binary code to represent each character scanned and utilizing the fourth bit position to indicate the occurrence of the maximum number of areas in a predetermined one of the three scanned rows.

There is also provided apparatus for reading characters formed by a plurality of areas of equal size, each area being positioned at an intersection of the rows and columns of a notional matrix, the number of rows in the matrix and the arrangement of said areas to form a character being chosen so that the number of areas in each of at least three rows of the matrix identify a character, the apparatus comprising means sensing the areas in said three rows to produce, for each row, a signal representing the total number of areas in a row; means for moving said areas past said sensing means; and a coding device responsive to the signals produced by a said sensing means for generating bit signals of a four position binary code to represent the character moving past said sensing means, said coding device including a logic circuit for assigning a predetermined binary value to the fourth code position upon occurrence of the maximum number of areas in a predetermined one of said three rows.

Figure 2:
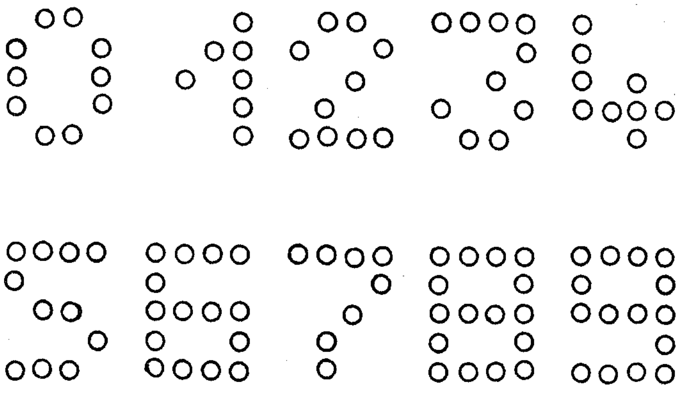
Figure 3:
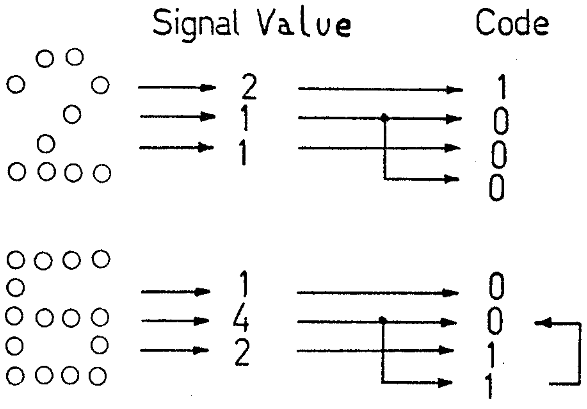
Figure 4:
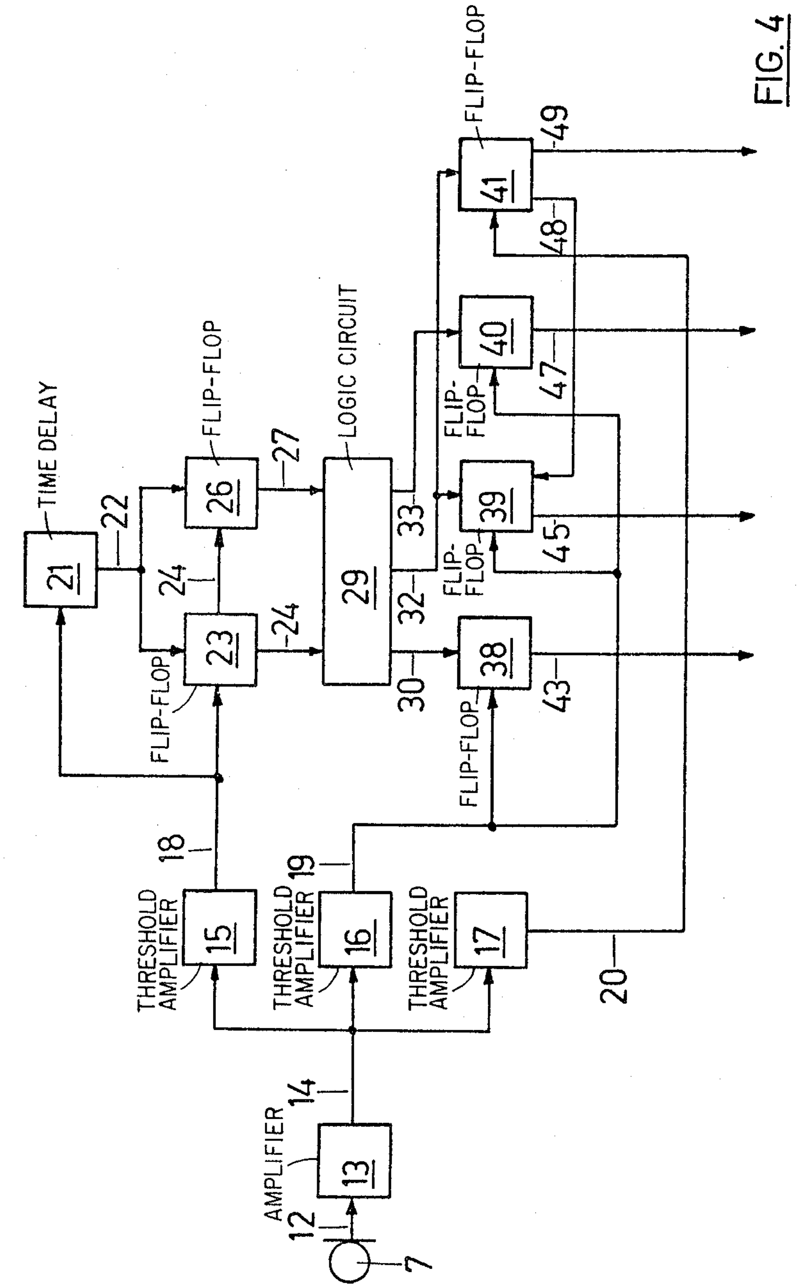
Figure 5:
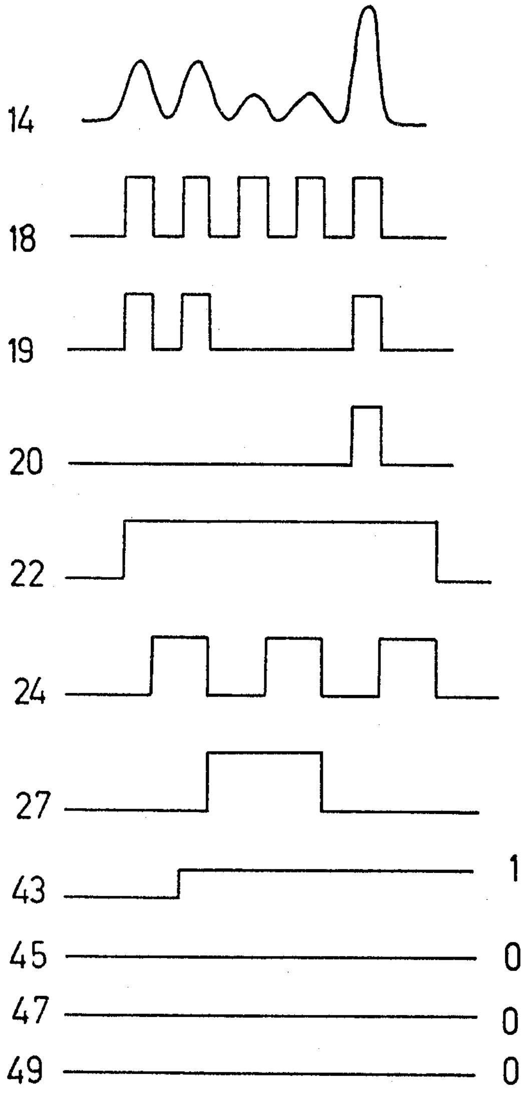

In order that the invention may be fully understood a preferred embodiment thereof will be explained below with the aid of the accompanying drawings, in which:

FIG. 1 illustrates a photoelectric cell and light source scanning a character formed by perforations in a paper tape, FIG. 2 shows how the digits 0 to 9 are formed by areas of equal size arranged at the intersections of a notional matrix or grid having 4 column lines and 5 row lines, FIG. 3 shows two examples of how the brightness values obtained by scanning the second, third and fourth row lines of the matrix on which the characters 2 and 6 are formed are coded in a binary code, FIG. 4 is a block diagram of an electronic coding system, and FIG. 5 shows graphs of signals produced by the electronic coding system shown in FIG. 4.

Referring now to FIG. 1 there is shown a character reading head comprising a mask 4 having a slit aperture 5 through which light from a source 3 is passed to illuminate perforations 2 in a paper tape 1. The light passed through the perforations 2 is imaged via an optical filter 6 on a single photocell 7 which produces an output signal whose magnitude is proportional to the number of perforations overlying the slit 5. The output signal from the photocell 7 is fed via line 12 to a coding device 9. To ensure even illumination of the slit aperture 5 a diffusing screen 8 is located between the slit 5 and the light source 3.

The perforations 2 are arranged in a pattern forming the numeral two which by moving the paper tape across the slit aperture 5 in the direction indicated by the arrow A is scanned from top to bottom. The pattern of perforations forming a character is defined by the positions of intersections between five row and four column lines of a notional matrix or grid. The positioning of the perforations on such a matrix to form the numerals 0 to 9 is more clearly illustrated in FIG. 2. Furthermore the number of perforations used for each character is such as to allow each character to be identified by scanning only the second, third and fourth row lines, which for each character have either one, two or four perforations only. Scanning of the first row line is used to prepare the device 9 for coding as will be explained in more detail with reference to FIG. 4.

When such characters are scanned by the reading head shown in FIG. 1, the photocell produces a signal value 1 corresponding to one perforation and signal values 2, 3 and 4 corresponding respectively to the scanning of 2, 3 and 4 perforations. From FIG. 2 it can then be seen that in lines 2 to 4 of the digits 0 to 9 only the signal values 1, 2 and 4 occur. The binary value of the first code position of the binary 4 position code is determined by the signal produced on scanning the second line, the binary values of the second and fourth code positions by the signals produced on scanning the third line, and the binary value of the third code position by the signal produced on scanning the fourth line. If the binary value '0' is associated with the signal value '1' the binary value '1' will be associated with the signal value 2. A binary '1' is associated with the signal value 4 resulting from scanning lines 2 or 4; if however the signal value 4 occurs on scanning line 3, a binary '0' is entered in the second code position and in addition a binary '1' is entered in the 4th code position. In all other cases the 4th code position is occupied by a binary '0.' In this way the numeral "2", which on being scanned produces signal values 2–1–1, is represented by the code number 1000; the last code position being occupied by a binary '0' because the signal value 4 does not occur, as shown in FIG. 3. Scanning lines two, three and four of the numeral '6' produces signal values 1–4– which are coded 0011, the last code position being occupied by a binary '1' because the signal value 4 occurs in line 3, as shown in FIG. 3.

FIG. 4 shows a block circuit diagram of the electronic coding device and FIG. 5 the signals in this device resulting from the scanning of the numeral "2." In the following description the reference numerals of the signals shown in FIG. 5 are the same as those used for the output lines in FIG. 4. The output signals 12 from the photocell 7 are fed to an amplifier 13 whose output 14 is connected to three threshold amplifiers 15, 16, 17. The thresholds of the amplifiers 15, 16, 17 are so adjusted that the amplifier 15 responds to signals having a value one or higher than one, the amplifier 16 to a signal having a value of two or higher than two, and amplifier 17 to a signal having a value of four. The output 18 of the amplifier 15 thus always supplies five rectangular pulses resulting from scanning the five row lines of each character.

A binary representation of the digit "2" (FIG. 3) indicated by the states of the four flip-flops 38, 39, 40, 41 (hereinafter referred to as FF's) is effected in the following manner. The perforations in each line of the character "2" produce a signal value sequence of 2–2–a0–1–4 at the amplifier output 14. The initial condition of the FF's 23, 26, 38, 39, 40, 41 at their outputs 24, 27, 43, 45, 47, 49 will be assumed to correspond to the logic value '0,' and it will be assumed that all the FF's are inhibited, so that the signals produced on scanning the first line of the character "2" produce no outputs 19, 20 from the amplifiers 16 and 17 respectively. However, the positive going edge of the first pulse produced on scanning the first line and available at the output 18 of the amplifier 15 removes the inhibition of the FF's 23 and 26 and time delay element 21 is set by the positive going edge of the first signal to produce a 'L' output on line 22 for the time it takes to scan a character. The negative going edge of the first pulse of signal 18 sets FF 23 so that a value '1' appears at the output 24 and is applied both to the FF 26 and logic circuit 29. FF 26 reacts only to 1–0 transitions of FF 23 and thus retains the logic value '0' at the output 27. The logic '1,' '0' combination at the outputs 24, 27 which is applied to the logic circuit 29 removes the inhibition of FF 38 and allows the signal produced on scanning the second line to set FF 38. Scanning of the second line of the digit "2" results in a signal value of two being produced so that the amplifier 16 responds and sets FF 38 through the line 19 to provide a logic value 1 on the output 43. The negative going edge of the second pulse of signal 18 now resets FF 23 providing a logic '0' at the output 24 which sets FF 26. At the outputs 24, 27 the logic value combination 0–1 consequently appears so that FF 38 is again inhibited and inhibitation of FF 39 and FF 41 removed by the logic circuit 29. The signal produced on scanning the 3rd line is then applied to FF 39 through the line 19. Scanning of the third line of the digit "2" results in a signal value of one being produced so that the amplifiers 16 and 17 do not operate and the outputs 45 and 49 of FF 39 and FF 41 respectively retain the logic value '0.' A signal value of two, such as would for example be produced by the 3rd line of the digits "4" (FIG. 3) or "5," would result in the response of only the amplifier 16, while a logic 1 would appear at the output 45 of FF 39 and output 49 of FF 41 would retain a logic value 0. A signal value of four such as would be produced by the 3rd line of the digits "6," "8" and "9" would result in the response of amplifiers 16 and 17, that is to say the logic value 1 would appear at the outputs 45 and 49. FF 39 and FF 41 are however coupled through line 48 and the occurrence of a logic 1 at the output 49 has the effect of resetting FF 39.

The negative going edge of the third pulse of signal 18 sets FF 23 and a logic 1 appears again at the output 24 so that the logic combination '1,' '1,' appears at the outputs 24 and 27 inhibiting FF 39 and FF 41 while inhibition of FF 40 is removed allowing the signal producing in scanning the 4th line to be applied to FF 40. Scanning the 4th line of the digit "2" produces a signal value of one and the amplifier 16 does not respond, so that the output 47 of FF 40 retains the logic value '0.' Through the negative going edge of the fourth pulse of signal 18 the logic value '0' appears again at outputs 24 of FF 23 and at output 27 of FF 26, so that FF 40 is again inhibited by signals applied from the logic circuit 29. FF's 38, 39, 40, 41 are now all inhibited so that the signal produced on scanning the 5th line has no effect.

After the binary information stored in FF's 38, 39, 40, 41 representing the scanned character "2" has been used for controlling processing or handling operations, FF's 38, 39, 40, 41 are reset to their initial condition by resetting means known in themselves, so that the coding device is again ready to receive signals produced on scanning the next character.

In addition to photoelectric scanning methods the invention naturally also embraces electrical and mechanical scanning methods and the use of a large number of recording carriers, such as films, papers, metal tapes, and the like.

The advantages achieved by the above described preferred embodiment of the present invention consist above all in those characters which are readily visually identifiable and can also be identified by a photo-electric scanning device with a light source and a single photoelectric cell, whereas the previously mentioned methods require a plurality of photoelectric cells for identifying a character.

What is claimed is:

1. Apparatus for reading visually legible characters formed by a plurality of areas of equal size, each area being positioned at an intersection of the rows and columns of a notional matrix, the number of rows in the matrix and the arrangement of said areas to form a character being chosen so that the number of areas in each of at least three of the same rows of the matrix identify each character, the apparatus comprising photosensitive means, a light source, and between said photosensitive means and light source a mask defining a slit aperture, means for moving said characters past said mask in a direction aligning the rows of the character parallel with said slit, said photosensitive means being a single photo-electric cell and generating, for each of said three rows passing said slit, a signal representing the total number of areas in a row, and a coding device responsive to the three signals generated by said photosensitive means detecting the number of areas in each of said three rows for generating bit signals of a four position binary code to represent the character moving past said mask, said coding means including first circuit means for assigning a predetermined binary value to the fourth code position upon occurrence of the maximum number of areas in a predetermined one of said three rows.

2. Apparatus according to claim 1 wherein said matrix comprises five rows and four columns and the number of areas in any one of the second, third and fourth rows being one, two or four, said coding device being responsive to signals generated by said photosensitive means sensing the number of areas in the second, third and fourth rows to provide said coded representations of said characters.

3. A method of reading visually legible characters formed by a plurality of areas of equal size wherein each said area is positioned at an intersection of the rows and columns of a notional matrix having five rows and four columns, and wherein the arrangement of said areas to form a character is chosen such that the number of areas in each of at least three of the same rows of the matrix identify each character and each character includes only one, two or four areas in each of said three rows, which comprises the steps of scanning said three rows of a character to produce, for each row, a signal representing the total number of areas in a row, and deriving from the signals obtained by scanning further signals representing bits in a four position binary code to represent each character scanned, the scanning of four areas in the second of said three rows producing two bit signals representing respectively a logic '1' and a logic '0', one of said two bit signals being assigned to the second position of said four position binary code and the other bit signal being assigned to the fourth position of said four position binary code.

4. Apparatus for reading visually legible characters formed by , plurality of areas of equal size, wherein each said area is positioned at the intersection of the rows and columns of a notional matrix having five rows and four columns, and wherein the arrangement of said areas to form each character is chosen so that the number of areas in each of the second, third a and fourth rows of the matrix identify each character and the number of areas in any one of said second, third and fourth rows are one, two or four, which comprises means for sensing said second, third and fourth rows to produce for each row a signal representing the total number of areas in a row, said sensing means including a light source, a photosensitive device and a mask therebetween defining a slit aperture, means for moving the characters past said mask in a direction aligning the rows of a character parallel with said slit, and a coding device responsive to signals generated by said photosensitive device sensing the number of areas in said second, third and fourth rows for generating bit signals of a four position binary code to represent the character moving past said slit aperture, said coding device comprising first, second and third threshold amplifiers producing output signals in response to the application thereto respectively of signals from said photosensitive device resulting from the sensing of one or more than one, two or more than two and four areas in a row of a character, and four flip flops each assigned to a different one of the four positions of said four position binary code, and said coding device also including a logic circuit for assigning a predetermined binary value to the fourth code position upon occurrence of the maximum number of areas in a predetermined one of said second, third and fourth rows, said logic circuit including a timing device settable by said photosensitive device producing a signal in response to sensing of the first of said five rows of a character to produce a signal for the time required to sense all five rows of a character, a first flip-flop controlled by the setting of said timing device and operable by the output from said first threshold amplifier to provide a first logic signal, a second flip-flop controlled by the setting of said timing device and the state of the first flip-flop to provide a second logic signal, and a coding circuit responsive to the logic values of the first and second logic signals to condition said four flip-flops to receive signals produced by said second and third threshold amplifiers to thereby indicate the binary value of the character sensed by said photosensitive device.

5. Apparatus for reading visually legible characters formed by a plurality of areas of equal size, wherein each said area is positioned at the intersection of the rows and columns of a notional matrix having five rows and four columns, and wherein the arrangement of said areas to form each character is chosen so that the number of areas in each of the second, third and fourth rows of the matrix identify each character and the number of areas in any one of said second, third and fourth rows are one, two or four, which comprises means for sensing said second, third and fourth rows to produce for each row a signal representing the total number of areas in a row, means for moving said areas past said sensing means, and a coding device responsive to the signals produced by said sensing means for generating bit signals of a four position binary code to represent the character moving past said sensing means, said coding device comprising first, second and third threshold amplifiers producing output signals in response to the application thereto respectively, of signals from said sensing means resulting from the sensing of one or more than one, two or more than two and four areas in a row of a character, and said coding device also including a logic circuit for assigning a predetermined binary value to the fourth code position upon occurrence of the maximum number of areas in a predetermined one of said second, third and fourth rows, said logic circuit including a timing device settable by the output signal from said first threshold amplifier to provide a timing signal for the time required to sense all five rows of a character, a first flip-flop controlled by said timing signal and operable by the output from said first threshold amplifier to produce a first logic signal representing a binary value, a second flip-flop controlled by said timing signal and the binary value of the first logic signal to produce a second logic signal representing a binary value, third, fourth and fifth flip-flops coupled to the second threshold amplifier, a sixth flip-flop coupled to the third threshold amplifier, circuit means responsive to different combinations of binary values provided by said first and second logic signals to inhibit and release said third, fourth, fifth and sixth flip-flops to enable the third flip-flop to be set by the output signal produced by the second threshold amplifier when said sensing means senses the second row of a character, the fourth and sixth flip-flops to be set by the output signals produced by the second and third threshold amplifiers when said sensing means senses the third row of a character and the fifth flip-flop to be set by the output signal produced by the second threshold amplifier when said sensing means senses the fourth row of a character, and means coupling the fourth flip-flop to the sixth flip-flop so that on setting of the sixth flip-flop, the fourth flip-flop is reset and a binary representation is provided of the character sensed by said sensing means after the fourth row of that character is sensed.

* * * * *